Patented Mar. 14, 1944

2,344,356

UNITED STATES PATENT OFFICE 2,344,356

CHEMICAL COMPOUNDS β-(META-HYDROXYPHENOL)-ISOPROPYLAMINES

Gustav Hildebrandt, Mannheim, Germany, assignor to E. Bilhuber Inc., Jersey City, N. J.

No Drawing. Application December 27, 1937, Serial No. 181,988. In Germany January 2, 1937

3 Claims. (Cl. 260—570.8)

This invention relates to new and valuable chemical compounds comprising β-(meta-hydroxyphenyl)-isopropylamines of the general type formula

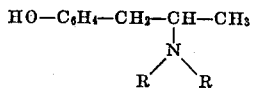

in which R designates hydrogen, an alkyl radical, for example methyl, ethyl, propyl, isopropyl, butyl, isobutyl, isoamyl, etc. or a cycloalkyl radical, for example cyclohexyl, ortho-, meta- or para-methylcyclohexyl, tetrahydronaphthyl, decahydronaphthyl etc.

It has already been proposed to prepare β-(para-methoxyphenyl)-isopropylmethylamine by condensing β-(para-methoxyphenyl)-isopropylamine with benzaldehyde to form the corresponding Schiff's base, treating the Schiff's base with methyl iodide or a similar compound and hydrolysing the resulting addition product with aqueous acid.

According to another proposal β-(para-methoxyphenyl)-isopropylmethylamine is prepared by treating para-methoxy-benzylmethylketone with reagents which yield formic acid and methylamine. The formyl compound of β-(para-methoxyphenyl)-isopropylmethylamine is obtained thereby and is saponified with dilute mineral acid. The β-(para-hydroxyphenyl)-isopropylmethylamine may be obtained from the β-(para-methoxyphenyl)-isopropylmethylamine obtained by either of the preceding processes, by eliminating the methoxy group with strong acid. According to known data this compound is physiologically active and is said to exert effects similar to those of ephedrine.

According to this invention it has been found that favourable therapeutic properties are possessed not only by the aforesaid derivative of β-(hydroxyphenyl)-isopropylamine, in which the hydroxy group is in the para-position, but that β-(meta-hydroxyphenyl)-isopropylamines in general possess similar favourable therapeutic properties.

The new compounds of this invention are prepared by treating β-(meta-methoxyphenyl)-isopropylamines, which correspond to the general type formula

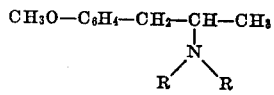

in which R designates hydrogen, an alkyl radical, for example methyl, ethyl, propyl, isopropyl, butyl, isobutyl, isoamyl etc. or a cycloalkyl radical, for example cyclohexyl, ortho-, meta- or para-methyl-cyclohexyl, tetra-hydronaphthyl, decahydronaphthyl etc., with strong acids whereby the methoxy group is eliminated.

For eliminating the methoxy group use is preferably made of strong mineral acids, particularly hydrohalogenic acids, for example hydrobromic acid. The treatment is effected with concentrated acids, for example with 48% hydrobromic acid. The treatment may be promoted by heating. The methoxy compound is preferably boiled with concentrated acid.

The β-(meta-hydroxyphenyl)-isopropylamines used as starting materials for the preparation of the β-(meta-hydroxyphenyl)-isopropylamines may be prepared in any desired manner. They are however most suitably prepared by condensing meta-methoxybenzyl-methylketone with amines, corresponding to the general formula RNH₂, wherein R designates hydrogen, an alkyl radical or a cycloalkyl radical and simultaneously or subsequently reducing the condensation product.

*Example*

50 gms. of meta-methoxybenzylmethylketone, 30 gms. of activated aluminium turnings, 1000 ccs. of absolute ether and 75 ccs. of 40% aqueous methylamine solution are boiled under reflux for 6 hours on a water bath. After separating the undissolved constituents the solution is evaporated down and thereafter taken up in dilute acid. Non-basic constituents are removed from the solution by extraction with ether. The resulting β-(meta-methoxyphenyl)-isopropylmethylamine is precipitated by adding alkali. (Boiling point₁₀, 130 to 135° C.) Yield: 80–90%.

By boiling the base with the five-fold quantity of 48% hydrobromic acid for one hour under reflux the methoxy group is eliminated. β-(meta-hydroxyphenyl)-isopropylmethylamine is recovered therefrom in known manner. The hydrochloride of the base forms beautiful crystals which sinter at 128 to 130° C. and melt at 182° C. The yield amounts to about 90%.

What I claim is:

1. The chemical compounds β-(meta-hydroxyphenyl)-isopropylamines of the formula

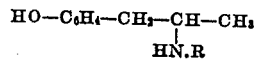

wherein R is a lower alkyl radical.

2. A metamethoxybenzylmethyl-carbinmethyl-amine base having the formula
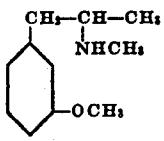
3. A metahydroxybenzylmethyl-carbinmethyl-amine base having the formula
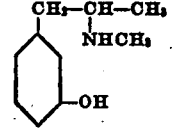
GUSTAV HILDEBRANDT.